ство
3,433,784
PENICILLINS SUBSTITUTED WITH
HETEROCYCLIC GROUPS
Anthony Alfred Walter Long, Reigate, and John Herbert Charles Nayler, Dorking, England, assignors to Beecham Group Limited, Brentford, Middlesex, England, a British company
No Drawing. Filed Apr. 19, 1967, Ser. No. 631,850
Claims priority, application Great Britain, Apr. 26, 1966, 18,130/66
U.S. Cl. 260—239.1   11 Claims
Int. Cl. C07d 99/16, 99/14

ABSTRACT OF THE DISCLOSURE

Penicillins of the general formula:

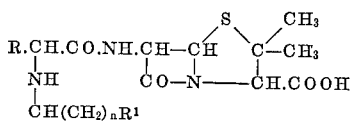

in which R is a phenyl or thienyl group, $R^1$ is a heterocyclic group which may be substituted and $n$ is zero or 1 and their salts are valuable as antibacterial agents.

---

This invention relates to new penicillins and is particularly concerned with a new class of penicillins which are derivatives of 6-aminopenicillanic acid and which are of value as antibacterial agents, as nutritional supplements in animal food, as agents for the treatment of mastitis in cattle and as therapeutic agents in poultry and animals, including man, in the treatment especially of infectious diseases caused by gram-positive and gram-negative bacteria.

According to the present invention there is provided penicillins of the general formula:

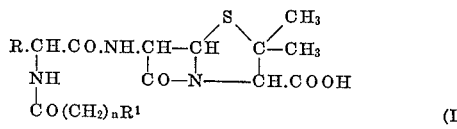

and non-toxic salts thereof, where R is a phenyl or thienyl group, $R^1$ is a heterocyclic group which may be substituted and $n$ is zero or 1.

The heterocyclic group $R^1$ may be either monocyclic or bicyclic (e.g. quinolyl or phthalimido) and examples of suitable substituents include halogen atoms and lower alkyl, aryl, lower alkoxy, lower alkylthio and hydroxy groups. (The term "lower" is to be understood as meaning containing from 1 to 5 carbon atoms.) Two adjacent substituents in the heterocycle may form an alkylenedioxy bridge. When the heterocycle is partially or fully reduced, one or more of the constituent carbon atoms may be present in the form of carbonyl groups.

Preferably the group $R^1$ is an isoxazolyl, pyridyl, thienyl, phthalimido, piperidyl, pyranyl or furyl group.

The salts are non-toxic salts including non-toxic metallic salts such as sodium, potassium, calcium and aluminium, ammonium and substituted ammonium salts, e.g. salts of such non-toxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin.

The present invention further provides a process for the preparation of new penicillins having the general Formula I in which an aminomethylpenicillin of the general formula:

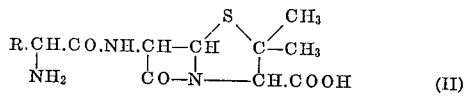

is treated with a reactive derivative of an acid of the general formula:

$$R^1(CH_2)_nCOOH \qquad (III)$$

where R, $R^1$ and $n$ are as hereinbefore defined.

The reactive derivative of the acid may be the acid halide, azide, anhydride, mixed anhydride, or the reactive intermediate formed from the acid and a carbodiimide or carbonyldiimidazole.

The following examples illustrate the invention:

EXAMPLE 1

D-α-(5-methylisoxazole-3-carbonamido)benzylpenicillin

A suspension of D-α-aminobenzylpenicillin trihydrate (12.8 g.) in water (80 ml.) was adjusted to pH 9.2 by the addition of 5 N aqueous sodium hydroxide solution. To the resulting solution was added, in a stream with stirring, a solution of 5-methylisoxazole-3-carbonyl chloride (4.6 g.) in isobutyl methyl ketone (100 ml.). The mixture was stirred at room temperature for two hours, then it was filtered through Dicalite and the layers were separated. The organic phase was washed with saturated brine (2×50 ml.), then it was treated with a 2 N solution of sodium 2-ethylhexanoate in isobutyl methyl ketone (16 ml.) whereupon the sodium salt of D-α-(5-methylisoxazole-3-carbonamido)benzylpenicillin separated as a gum which crystallised upon trituration with diethyl ether. The product (13.0 g.) was collected, washed with diethyl ether, and dried in vacuo over phosphorus pentoxide. Colorimetric assay with hydroxylamine against a benzylpenicillin standard indicated it to be 97% pure.

EXAMPLE 2

D-α-(5-methylisoxazole-4-carbonamido)benzylpenicillin

Similar reaction between D-α-aminobenzylpenicillin (12.8 g.) and 5-methylisoxazole-4-carbonyl chloride (4.6 g.) yielded the sodium salt of D-α-(5-methylisoxazole-4-carbonamido)benzylpenicillin (13.4 g.). The product was 87% pure by hydroxylamine assay.

EXAMPLE 3

D-α-(2-furancarbonamido)benzylpenicillin

D-α-aminobenzylpenicillin (8.06 g.) and 2-furoyl chloride (2.62 g.) reacted under similar conditions to give the sodium salt of D-α-(2-furancarbonamido)benzylpenicillin (9.2 g.), 87% pure by hydroxylamine assay.

EXAMPLE 4

D-α-(3-thiophencarbonamido)benzylpenicillin

D-α-aminobenzylpenicillin (5.24 g.) and 3-thenoyl chloride (1.96 g.) similarly gave the sodium salt of D-α-(3-thiophencarbonamido)benzylpenicillin (5.5 g.), 92% pure by hydroxylamine assay.

EXAMPLE 5

D-α-(2-thiophencarbonamido)benzylpenicillin

D-α-aminobenzylpenicillin (4.03 g.) and 2-thenoyl chloride (1.7 g.) reacted similarly to give the sodium salt of D-α-(2-thiophencarbonamido)benzylpenicillin (4.0 g.), 93% pure by hydroxylamine assay.

EXAMPLE 6

D-α-(thiophen-2-acetamido)benzylpenicillin

D-α-aminobenzylpenicillin (4.0 g.) and thiophen-2-acetyl chloride (2.0 g.) reacted under similar conditions to give the sodium salt of D-α-(thiophen-2-acetamido)-benzylpenicillin (4.9 g), 99% pure by hydroxylamine assay.

EXAMPLE 7

D-α-(thiophen-3-acetamido)benzylpenicillin

The reaction between D-α-aminobenzylpenicillin (4.03 g.) and thiophen-3-acetyl chloride (1.6 g.) similarly gave the sodium salt of D-α-(thiophen-3-acetamido)benzylpenicillin (4.9 g.) 98% pure by hydroxylamine assay.

EXAMPLE 8

D-α-(3-ethoxyquinoline-4-carbonamido)benzylpenicillin 3-ethoxyquinoline-4-carboxylic acid (1.08 g.) was warmed with thionyl chloride (5 ml.) at 70° for 3 hrs., then volatile matter was removed in vacuo, finally by co-distillation with dry benzene. The residual solid acid chloride hydrochloride (1.36 g.) dissolved in methylene chloride (20 ml.) was added to a stirred solution of D-α-aminobenzylpenicillin (1.75 g.) in a mixture of methylene chloride (20 ml.) and triethylamine, (2.1. ml.). The resulting red solution was stirred at room temperature for 2 hours, then treated with more triethylamine to bring it to pH 7 and evaporated at low temperature and pressure. The residue was dissolved in water (40 ml.) and adjusted to pH 3 with N-hydrochloric acid. The gum which separated was collected, washed with water and methyl isobutyl ketone, and finally converted into an amorphous colourless solid by digestion with dry ether. This penicillin (28% yield) was estimated by colorimetric assay with hydroxylamine to be 91% pure.

EXAMPLE 9

D-α-(8-methoxyquinoline-2-carbonamido)benzylpenicillin 8-methoxyquinaldic acid monohydrate (4.42 g.) was suspended in dry methylene chloride (25 ml.), cooled to −5°, and stirred whilst phosphorus pentachloride (10.4 g.) was added. The mixture was stirred for 30 minutes without external cooling, then the bright red residue was filtered off and washed with dry methylene chloride (5 ml.). It was then dissolved in a larger volume (25 ml.) of dry methylenechloride and added dropwise with stirring to a solution of D-α-aminobenzylpenicillin (3.49 g.) and triethylamine (5.6 ml.) in dry methylene chloride (50 ml.) at 0°. The mixture was then stirred for 30 minutes without external cooling. The methylene chloride was removed at low pressure and temperature below 20° and the residue dissolved in water (30 ml.) and isobutyl methyl ketone (30 ml.) and brought to pH 3 with dilute hydrochloric acid. The two phases were separated and the organic phase was washed with water (two portions of 20 ml.) then with saturated brine (two portions of 20 ml.) and filtered through a siliconised filter paper into a 40% w./w. solution of sodium 2-ethylhexoate in isobutyl methyl ketone (4.2 g.) which had been diluted with dry diethyl ether (1500 ml.). The fawn solid which precipitated was filtered off, washed with dry diethyl ether, and dried in vacuo over phosphoruspentoxide to give the sodium salt of the penicillin (3.2 g.), estimated by hydroxylamine assay to be 83% pure.

EXAMPLE 10

D-α-(2-pyridylcarbonamido)benzylpenicillin

A suspension of pyridine-2-carboxylic acid (1.85 g.) in methylene chloride (20 ml.) containing thionyl chloride (2.16 ml.) was refluxed gently for about 10 minutes until evolution of gases ceased, then the suspension was evaporated to dryness at reduced pressure and temperatures below 20°. The residue stood in vacuo over phosphorus pentoxide for one hour.

The solid was then suspended in isobutyl methyl ketone at 0° and added in one portion to an ice-cold solution of D-α-aminobenzylpenicillin trihydrate (4.0 g.) in water (20 ml.) to which sufficient 2N aqueous sodium hydroxide had been added to dissolve the penicillin and to bring the pH to 9.5. The mixture was vigorously stirred and the pH was maintained at 7 by the rapid addition of 2 N aqueous sodium hydroxide. After ca 3 minutes the pH remained at 7. The suspension was stirred rapidly for a further hour, then brought to pH 3.5 with 5 N hydrochloric acid, and the phases were allowed to separate. The organic phase was washed with water (3 portions of 10 ml.) and then with saturated brine (30 ml.). It was then filtered through a siliconised filter paper into rapidly stirred diethyl ether (500 ml.) containing 40% w./w. sodium 2-ethylhexoate in isobutyl methyl ketone (4.2 g.). A white solid precipitated and was filtered off, washed with diethyl ether, and dried in vacuo over phosphorus pentoxide to give the sodium salt of the penicillin (2.0 g.) estimated by hydroxylamine assay to be 90% pure.

EXAMPLE 11

D-α-(phthalimidoacetamido)benzylpenicillin

A solution of phthalimidoacetyl chloride (2.25 g.) in methyl isobutyl ketone (50 ml.) was added gradually to a stirred solution of D-α-aminobenzylpenicillin trihydrate (4.0 g.) and triethylamine (1.4 ml.) in water (50 ml.). The mixture was stirred for 1 hour, then the layers were separated and the aqueous phase (now at pH 2) was extracted with a further 50 ml. of methyl isobutyl ketone. The two methyl isobutyl ketone solutions were combined and washed with water (2×50 ml.) followed by saturated brine (2×50 ml.). A 2 N solution of sodium 2-ethylhexoate in methyl isobutyl ketone was added gradually until no further solid separated then the precipitate was collected, washed with ether, and dried in vacuo to give the sodium salt of D-α-(phthalimidoacetamido)benzylpenicillin (2.7 g.). This product was estimated by manometric (penicilinase) assay to be 77% pure.

EXAMPLE 12

D-α-(2,6-dioxopiperidyl-4-acetamido)benzylpenicillin

A solution of 2,6-dioxopiperidine-4-acetyl chloride (1.9 g.) in dry acetone (50 ml.) was added dropwise during 30 minutes with simultaneous addition of triethylamine (1.4 ml.) to a stirred solution of D-α-aminobenzylpenicillin trihydrate (4.0 g.) and triethylamine (1.4 ml.) in water (50 ml.). The mixture was stirred for 1 hour and then concentrated at low temperature and pressure to a volume of about 45 ml. Ethyl acetate (50 ml.) was added and the mixture was stirred vigorously whilst sufficient dilute hydrochloric acid was added to bring the aqueous phase to pH 2. The layers were separated and the aqueous phase was washed with water (50 ml.) followed by saturated brine (2×75 ml.). A 2 N solution of sodium 2-ethylhexoate in isopropanol was added gradually until no further solid separated, then the precipitate was collected, washed with ether, and dried in vacuo to give the sodium salt of the penicillin (4.2 g.). Colorimetric assay with hydroxylamine indicated it to be about 86% pure.

EXAMPLE 13

D-α-(2-oxopyran-5-carbonamido)benzylpenicillin

D-α-aminobenzylpenicillin trihydrate (4.0 g.) was treated with coumalyl chloride (1.6 g.) by the general procedure of Example 12, except that the mixture was kept at 0° during the acylation stage. The sodium salt of the resulting penicillin (2.5 g.) was shown by hydroxylamine assay to be almost pure.

EXAMPLE 14

D-α-(5-methyl-3-phenylisoxazole-4-carbonamido)benzylpenicillin

D-α-aminobenzylpenicillin trihydrate (4.03 g.) and 5-methyl-3-phenylisoxazole-4-carbonyl chloride (2.6 g.) reacted under the general conditions of Example 1 to give the sodium salt of D-α-(5-methyl-3-phenylisoxazole-4-carbonamido)benzylpenicillin (5.6 g.), 92% pure by hydroxylamine assay.

EXAMPLE 15

D-α-(3-methyl-5-phenylisoxazole-4-carbonamido)benzylpenicillin

D-α-aminobenzylpenicillin trihydrate (6.04 g.) was treated with 3-methyl-5-phenylisoxazole-4-carbonyl chloride (3.33 g.) by the general procedure of Example 1. The resulting penicillin (5.8 g.) gave an hydroxylamine assay of 109%.

EXAMPLE 16

D-α-(5-bromo-2-methylthiopyrimidine-4-carbonamido)benzylpenicillin

D-α-aminobenzylpenicillin trihydrate (1.66 g.) was treated with 5-bromo-2-methylthiopyrimidine-4-carbonyl chloride (1.1 g.) under the general conditions of Example 1. The resulting penicillin (1.87 g.) was 89% pure by hydroxylamine assay.

EXAMPLE 17

D-α-(2-thienylacetamido)-2-thienylmethylpenicillin

D-α-amino-2-thienylmethylpenicillin (3.55 g.) was reacted with thiophen-2-acetyl chloride (1.6 g.) under the general conditions of Example 1 to give the sodium salt of D-α-(2-thienylacetamido)-2-thienylmethylpenicillin (4.22 g.), 100% pure by hydroxylamine assay.

EXAMPLE 18

D-α-(2-furamido)-2-thienylmethylpenicillin

D-α-amino-2-thienylmethylpenicillin (3.55 g.) was treated with 2-furoyl chloride (1.4 g.) under the conditions described in Example 1. The resulting penicillin (4.55 g.) was 81% pure by hydroxylamine assay.

EXAMPLE 19

D-α-nicotinamidobenzylpenicillin

A solution of anhydrous D-α-aminobenzylpenicillin (10.47 g.) and triethylamine (12.5 ml.) in methylene chloride (60 ml.) was treated during 5 minutes with a solution of nicotinoyl chloride (4.24 g.) in methylene chloride (40 ml.). The mixture was stirred for 3 hours at room temperature then it was evaporated to dryness in vacuo. A portion of the product (5.0 g.) was dissolved in water, the solution was adjusted to pH 2.5 by the addition of dilute hydrochloric acid, and the D-α-nicotinamodibenzylpenicillin (1.26 g.) was collected.

EXAMPLE 20

D-α-(2-furylacetamido)benzylpenicillin

A solution of 2-furylacetic acid (12.8 g.) in dry acetone (100 ml.) was neutralised with triethylamine (10.1 g.), cooled to 0° C., and treated with stirring with ethyl chloroformate (10.9 g.) added dropwise at such a rate that the temperature never rose above 5° C. The mixture was stirred at 0° for 15 min. during which time triethylamine hydrochloride separated and the mixed anhydride formed in solution. The mixture was then cooled to −50° C. and added all at once to a stirred ice-cold solution prepared from D-α-aminobenzylpenicillin trihydrate (40.3 g.), water (200 ml.), and sufficient 5 N sodium hydroxide to bring the mixture to pH 9.

The mixture was stirred for 1 hr. whilst it attained room temperature, then extracted with ether to remove acetone. The aqueous phase was next acidified to pH 2 and the liberated free penicillin acid was extracted into methyl isobutyl ketone (3×50 ml.). The solvents extracts were washed with saturated brine then treated with a 2 N solution of sodium 2-ethylhexanoate in methyl isobutyl ketone to precipitate the sodium salt of the penicillin, which was collected and dried.

We claim:
1. A penicillin of the formula:

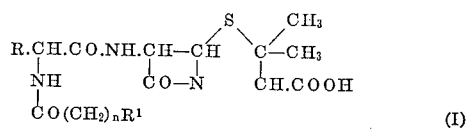

$$\text{(I)}$$

and non-toxic salts thereof, where R is phenyl or thienyl, $R^1$ is a heterocyclic group which is 2- or 4-quinolyl or N-phthalimido or a monocyclic 5- or 6-member ring attached through a ring carbon having one element S, or O or N or combined singly with a non-adjacent N in the ring the remaining ring atoms being carbon, said heterocyclics having zero to 2 substituents selected from the group consisting of bromo, lower alkyl, lower alkoxy, lower alylthio, phenyl and when the heterocyclic is fully or partially reduced, keto. and $n$ is zero or 1.

2. A penicillin according to claim 1 wherein $R^1$ is 3- or 4-isoxazolyl, 2- or 3-pyridyl, 2- or 3-thienyl, phthalimido, 4(2,6-dioxopiperidyl), 5(2-oxopyranyl), 2-furyl or 4-pyrimidyl.

3. A penicillin according to claim 11 wherein said heterocyclic group $R^1$ is substituted with at least one substituent which is a member selected from the group consisting of halogen, alkyl or 1 to 5 carbon atoms, alkoxy wherein the alkyl is of 1 to 5 carbon atoms, alkylthio wherein the alkyl is of 1 to 5 carbon atoms and phenyl.

4. D-α-(5-methylisoxazole - 3 - carbonamido)benzylpenicillin.

5. D - α - (5-methylisoxazole-4-carbonamido)benzylpenicillin.

6. D-α-(2-thiophencarbonamido)benzylpenicillin.

7. D-α-(2-pyridylcarbonamido)benzylpenicillin.

8. D-α-(phthalimidoacetamido)benzylpenicillin.

9. D-α-(2,6-dioxopiperidyl - 4 - acetamido)benzylpenicillin.

10. D-α-(2-oxopyran-5-carbonamido)benzylpenicillin.

11. D-α-(2-furamido)-2-thienylmethylpenicillin.

References Cited

UNITED STATES PATENTS 3,252,851  11/1967  Fosker _____ 260—239.1

ALEX MAZEL, *Primary Examiner.*

D. G. DAUS, *Assistant Examiner.*

U.S. Cl. X.R.

260—309, 307, 347.3, 332.2, 287, 295, 326.3, 281, 251, 295.5, 343.5, 999